United States Patent
Coupard et al.

(10) Patent No.: US 8,362,288 B2
(45) Date of Patent: Jan. 29, 2013

(54) PROCESS FOR PREPARING ESTERS OF ALCOHOLS AND GLYCERIN FROM TRIGLYCERIDES AND ALCOHOLS USING A HETEROGENEOUS CATALYST IN THE PRESENCE OF A CONTROLLED QUANTITY OF WATER

(75) Inventors: Vincent Coupard, Villeurbanne (FR); Sylvie Maury, Charly (FR); Veronique Pugnet, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 329 days.

(21) Appl. No.: 12/879,528

(22) Filed: Sep. 10, 2010

(65) Prior Publication Data
US 2011/0065942 A1    Mar. 17, 2011

(30) Foreign Application Priority Data

Sep. 11, 2009 (FR) ..................................... 09 04349
Jul. 15, 2010 (FR) ..................................... 10 02971

(51) Int. Cl.
*C11C 3/00* (2006.01)
(52) U.S. Cl. ........ 554/169; 554/124; 554/162; 554/170; 502/342
(58) Field of Classification Search .................. None
See application file for complete search history.

(56) References Cited

U.S. PATENT DOCUMENTS

| | | | |
|---|---|---|---|
| 5,908,946 | A | 6/1999 | Stern et al. |
| 6,878,837 | B2 * | 4/2005 | Bournay et al. ............... 554/169 |
| 2004/0034244 | A1 | 2/2004 | Bournay et al. |
| 2004/0234448 | A1 | 11/2004 | Hillion et al. |
| 2005/0113588 | A1 | 5/2005 | Hillion et al. |
| 2010/0094062 | A1 | 4/2010 | Rabello et al. |

FOREIGN PATENT DOCUMENTS

| | | |
|---|---|---|
| EP | 1 460 124 A1 | 9/2004 |
| EP | 1 468 734 A1 | 10/2004 |
| FR | 2 752 242 A1 | 2/1998 |
| FR | 2 794 768 A1 | 12/2000 |
| FR | 2 838 433 A1 | 10/2003 |
| WO | WO 2008/129226 A1 | 10/2008 |

OTHER PUBLICATIONS

Search Report of FR 0904349 (May 3, 2010).

* cited by examiner

*Primary Examiner* — Yate K Cutliff
(74) *Attorney, Agent, or Firm* — Millen, White, Zelano & Branigan, P.C.

(57) ABSTRACT

A process for preparing a composition of alcoholic esters of straight chain monocarboxylic acids containing 6 to 26 carbon atoms and glycerin, starting from a vegetable or animal oil, neutral or acidic, virgin or recycled with mono-alcohols containing 1 to 18 atoms, in the presence of a zinc aluminate catalyst and in the presence of a controlled quantity of water, can directly produce, in one or more steps, an ester which can be used as a propellant or fuel along with glycerin having improved purity containing a reduced quantity of ethers by using a partially dried catalyst.

21 Claims, No Drawings

PROCESS FOR PREPARING ESTERS OF ALCOHOLS AND GLYCERIN FROM TRIGLYCERIDES AND ALCOHOLS USING A HETEROGENEOUS CATALYST IN THE PRESENCE OF A CONTROLLED QUANTITY OF WATER

FIELD OF THE INVENTION

The present invention relates to a novel process for preparing alcoholic esters of monocarboxylic acids and glycerin starting from fats and oils of vegetable or animal origin, by heterogeneous catalysis.

The principal reaction which is envisaged is transesterification occurring in accordance with scheme I below, optionally coupled with reactions occurring in accordance with scheme II below.

Scheme I:

1 triglyceride+3 alcohols⇌3 fatty esters+1 glycerin

Scheme II:

1 fatty acid+1 alcohol⇌fatty acid ester+1 water 1 fatty acid+1 glycerin⇌1 fatty acid glyceride+1 water Under certain operating conditions and in the presence of catalysts containing Brønsted acid sites, the following reactions may take place:

Scheme III:

1 glycerol+1 alcohol→1 glycerol ether+1 water 1 glycerol+1 glycerol→+1 diglyceryl ether+1 water 1 alcohol+1 alcohol→1 ether+1 water There are currently no specifications regarding the quantity of ether in glycerin for industrial applications. However, if it is intended to upgrade the pure glycerin obtained using the process described in patent FR 2 838 433 in pharmaceutical or agro-alimentary applications, it is necessary to limit the quantity of ethers in that product as much as possible.

Prior Art

Fatty esters are currently used in many applications such as diesel fuels, domestic fuels, ecological solvents, base compounds for the fabrication of sulphonates of fatty alcohols, amides, of dimeric esters, etc.

In the case of diesel fuel, which currently constitutes a major application of fatty esters, a certain number of specifications have been established; a list of these, with limits and methods form the subject matter of the European Standard EN 14214 (2003) which is currently applicable in Europe. The ester must contain at least 96.5% by weight of esters, at most 0.8% by weight of monoglycerides, at most 0.2% by weight of diglycerides and at most 0.2% by weight of triglycerides, small amounts of free fatty acids (acid index<0.5 mg of KOH per g), which may be corrosive, less than 0.25% by weight of bound and free glycerin and metals only in trace amounts. This requires a precise protocol in order to obtain the desired purity.

When manufacturing an ester from an oil or fat and a monoalcohol, depending on the nature of the oil used at the beginning, 10% to 15% by weight of a co-product, namely glycerin, is automatically formed. This glycerin may be upgraded in a variety of applications, but initially it has to be purified (elimination of metals, salts, water). In order to attain that purity, vacuum bi-distillation is usually necessary.

In summary, the majority of commercial processes for manufacturing esters produce crude products (esters and glycerin) relatively readily; however, they have to be substantially purified using various treatments which considerably affect the cost of transformation.

Manufacturing methyl esters using conventional homogeneous catalysis pathways with soluble catalysts such as sodium hydroxide or sodium methylate is known, by reacting a neutral oil and an alcohol such as methanol (for example JAOCS 61, 343-348 (1984)). However, a pure product which can be used as a fuel and a glycerin which is within specifications is only obtained after a very large number of steps. The glycerin obtained is in fact polluted by alkali salts or alcoholates, so that the glycerin purification unit is almost as expensive as that for manufacturing the ester.

Heterogeneous catalysis processes offer the advantage of producing esters and glycerin which are free of catalyst and are thus easy to purify. However, it is often difficult to obtain both a high purity glycerin and an ester economically. The disadvantage of heterogeneous processes is that they have to be operated under pressure and temperature conditions that are more severe than with homogeneous processes. This favours secondary reactions such as intermolecular dehydration reactions between the alcohol functions of the reagents and the products mentioned in Scheme III.

Mention is rarely made of the formation of ethers in processes for the transesterification of a fat by an alcohol, except in patent EP-A-0 198 243 which is operated at high temperature with alumina catalysts with an acidic nature. Those ethers are formed by an intermolecular dehydration reaction between 2 alcohols, either the alcohol reagent or the glycerol formed (see Scheme III). Patent EP-A-0 198 243 mentions the formation of a high percentage of ethers in the glycerin (85% for transesterification temperatures of 250° C.). The quality of the glycerin may thus be degraded at high temperature. In the case in which a high purity glycerin is to be obtained, then, it is necessary to control the formation of these alcohol degradation products.

The synthesis of ethers from glycerol has been studied (Clacens J-M, Pouilloux Y and Barrault J, Selective etherification of glycerol to polyglycerols over impregnated basic MCM-41 type mesoporous catalysts, Applied Catalysis A: General 227, 181-190 (2002)) at temperatures of more than 220° C. over basic catalysts, the aim being to synthesize di- or tri-glycerols.

The synthesis of ethers from glycerol by reaction between glycerol and various alcohols (Gu Y, Azzouzi A, Pouilloux Y, Jérome F, Barrault J, Heterogeneously catalyzed etherification of glycerol: new pathways for transformation of glycerol to more valuable chemicals, Green Chemistry 2008, 10, 164-167) has been studied; in this case, those reactions were catalyzed by solid Brønsted acids at temperatures of <100° C.

However, this phenomenon has rarely been studied in transesterification reactions and the vast majority of studies have focussed on the yield and quality of the ester. The aim of this invention is to minimize the formation of ethers even in transesterification processes carried out at moderate temperatures ~150° C.).

The influence of the quantity of water on transesterification yields has been studied in the literature. Patent FR 2 752 242 mentions the deleterious effect of water which favours the formation of fatty acids by hydrolysis of esters. Patent FR 2 838 433 provides one example which shows that in a continuous process, quantities of water in the feed of more than 1500 ppm by weight cause a slight drop in the final ester yield (1 point) in the second reaction step (completion of transformation of glycerides after evaporation and separation of glycerin and the ester phase), which is prejudicial to the yield of the process. However, the impact of water content of the medium on the quality of the glycerin itself is not disclosed in this patent. The aim of that process is to limit as far as possible the quantity of water formed during the reaction. Similarly, patents FR 2 752 242 and FR 2 838 433 do not describe the influence of drying the catalyst prior to using it in the transesterification process.

The study presented in the article by Sreeprasanth P S, Srivastava R, Srinivas D and Ratnasamy P, Hydrophobic, solid catalyst for production of biofuels and lubricants, Applied Catalysis A: General 314, 148-159 (2006) shows that in the transesterification reaction on solid Lewis acids, the presence of water has no deleterious influence on the catalyst since the glycerol yield is maintained, but in contrast the ester yield deteriorates slightly (but is not quantified) via hydrolysis which leads to the formation of fatty acids.

Ebiura et al (Ebiura T, Tsuneo Echizen, Akio Ishikawa, Kazuhito Murai and Toshihide Baba, Selective transesterification of triolein with methanol to methyl oleate and glycerol using alumina loaded with alkali metal salt as a solid-base catalyst, Applied Catalysis B: Environmental 283, 111-116 (2005)) does not demonstrate a deleterious effect of water on the catalytic activity of basic catalysts of the $K_2CO_3$ on alumina type.

The study presented in the article by Bikou E, Louloudi A and Papayannakos N, The effect of water on the transesterification kinetics of cotton seed oil with ethanol, Chem Eng Technol 22, 74 (1999) demonstrates a deleterious effect of water on the transformation kinetics of cotton seed oil triglycerides with ethanol. In all of the cited prior art where the influence of water on catalysis in a closed reactor has been studied, no mention has been made of the formation of ethers nor of its assay in the glycerin; only the yield of the ester or the triglycerides conversion has been mentioned.

Surprisingly, the inventors have discovered that the deliberate addition of a known quantity of water to the medium employing a heterogeneous acido-basic catalyst such as zinc aluminate and being moderately dried can reduce the ether content of the glycerin while retaining a high yield of esters.

DETAILED DESCRIPTION OF THE INVENTION

The present invention describes an improvement of FR 2 752 242 and FR 2 838 433 for the preparation of a composition of alcoholic esters of straight chain monocarboxylic acids containing 6 to 26 carbon atoms and glycerin, in which a fat of animal or vegetable origin is reacted with an aliphatic monoalcohol containing 1 to 18 carbon atoms, preferably methanol, in the presence of at least one heterogeneous zinc aluminate type catalyst, by adding a controlled quantity of water to the reaction medium and in that a catalyst is used that has undergone, after a heat treatment, a drying step which is limited to drying in air at a temperature of more than 80° C. The quantity of water introduced with the feeds into the reactor is in the range 1700 to 3000 ppm with respect to the feed. Under these conditions, the quantity of water formed during the reaction becomes negligible compared with the quantity of water added.

Fats and Oils

The fats and oils used in the process of the invention correspond to natural or manufactured substances of animal or vegetable origin mainly containing triglycerides, and usually referred to by the terms oils and fats.

Examples of oils which may be used which may be cited are any of the usual oils, such as palm nut oils (hardened or oleins), soya, palm kernel, coprah, babassu, rapeseed (old or fresh), sunflower seed oil (conventional or oleic), corn, cotton seed, peanut oils, pourghere (Jatropha curcas), castor oil, linseed oil and crambe oil and any oils derived, for example, from sunflower or from rapeseed by genetic modification or hybridization or derived from algae.

It is also possible to use frying oils, rendered oils, various animal oils such as fish oil, seal oil, rendered oil, tallow, suet, or fats derived from the treatment of waste water and even poultry fats, as the esters manufactured from certain alcohols such as ethyl alcohol, isopropyl alcohol or butyl alcohol can increase the pour point by more than 10° C. and as a consequence, more saturated oils can be used at the start.

Oils which may be used which may also be indicated are oils that are partially modified, for example by polymerization or oligomerization, such as stand oil, linseed oil, sunflower seed oil and blown vegetable oils.

The oils used are neutral or acidic, virgin or recycled.

A priori, the presence of fatty acid in the oils is not prejudicial. However, in the case of oils with a very high acid index (close to 10 mg of KOH/g), one possibility is to precede the transesterification reaction by a reaction for esterification of the free fatty acids present, either by using the same alcohol as that used in the transesterification process in the presence of a strong acid such as sulphuric acid or soluble or supported sulphonic acids (of the Amberlyst 15® resin type), or by using, as is preferable, glycerin with the same catalytic system as that employed for the transesterification reaction, in order to form a total or partial glycerol ester at atmospheric pressure and preferably under vacuum and at temperatures in the range 150° C. to 220° C. The aim is to keep the acid index to a value which is preferably less than 0.5 mg KOH/g of oil.

When using frying oils, which constitute a very cheap starting material when producing a biodiesel, it is necessary to eliminate fatty acid polymers from the reaction mixture so that the mixture of esters satisfies the specifications in standard EN 14214. The aim is still to keep the acid index of the oil to, as is preferable, below 0.5 mg KOH/g. The presence of fatty acids in the medium may cause esterification reactions which produce too much water, which could reduce the purity of the co-produced glycerin phase.

Alcohol

The nature of the alcohol used in the process of the invention plays an important role in transesterification activity.

In general, a variety of aliphatic monoalcohols containing, for example, 1 to 18 carbon atoms, preferably 1 to 12 carbon atoms, can be used.

More preferably, methanol is used.

The most active is methyl alcohol. However, ethyl alcohol and isopropyl, propyl, butyl, isobutyl and even amyl alcohol may be used. It is also possible to use heavier alcohols such as ethylhexyl alcohol or lauryl alcohol.

Catalyst

The catalyst is prepared using the following operating protocol:

The catalyst preparation process used in the present invention comprises at least the following steps:
a) mixing at least one zinc oxide with hydrated alumina in the presence of at least one peptizing agent (mineral or organic acid);
b) extruding the product obtained after mixing;
c) heat treating;
d) optionally, milling to produce a shape that differs from that from extrusion;
e) drying after the heat treatment, limiting it to drying in air at a temperature of more than 80° C.

The catalyst used in the present invention may be in the form of powder, extrudates, beads or pellets.

The zinc compounds used are selected from zinc oxides which are commercially available or prepared by precipitation of zinc precursors.

The alumina precursor used has general formula $Al_2O_3, nH_2O$. In particular, it is possible to use hydrated compounds of alumina such as: hydrargillite, gibbsite, bayerite, boehmite or pseudo-boehmite and amorphous or essentially amorphous alumina gels. A mixture of these products in any combination may also be used. It is also possible to use dehydrated forms of said compounds, which are constituted by transition aluminas and which comprise at least one phase taken from the group: rho, khi, eta, kappa, theta, delta and gamma, which differ essentially in the organization of their crystalline structure.

Preferably, the peptizing agent is selected from hydrochloric acid, sulphuric acid, nitric acid, acetic acid and formic acid.

The choice of peptizing agent (its quantity, its concentration, its nature) and the conditions for mixing such as the rate of stirring, the duration of mixing and the loss on ignition used, are important parameters.

The concentration of peptizing agent is preferably in the range 2% to 15% by weight, more preferably in the range 4% to 10%.

The rotation rate of the arms of the mixer is less than 150 rpm, preferably in the range 15 to 75 rpm.

Mixing is carried out in a mixer for a period of 5 to 75 min, preferably in the range 15 to 60 min.

Extrusion may be carried out, for example, in a piston, single screw or twin screw extruder using any type of die, for example cylindrical, three-lobed, four-lobed, grooved or any other geometric shape.

The extrudates obtained undergo a heat treatment which consists of drying carried out at a temperature in the range 40° C. to 150° C., then calcining in air at a temperature in the range of 300° C. to 1100° C.

Highly preferably, drying is carried out between 70° C. and 120° C. and calcining between 350° C. and 800° C., and then it is stored in air.

Prior to using it in the process and after the heat treatment and storage steps, the catalyst is dried in an oven in air at a temperature of more than 80° C., preferably more than 100° C., more preferably in the range of 100° C. to 175° C., preferably for a period in the range 12 to 24 hours. The loss on ignition (LOI) of the catalyst dried thereby is more than 2%, preferably more than 5%.

It is important that the catalyst used in the process undergoes moderate drying and not severe drying. Moderate drying is drying limited to drying in air. In fact, severe drying of the catalyst, such as drying with methanol, causes degradation of the esters produced by hydrolysis by adding water to the reaction medium during the transesterification reaction, thus dropping the yield.

This catalyst principally contains basic sites, but also Lewis acid sites and Brønsted acid sites. The Brønsted acid sites are responsible for the glycerin degradation reactions under the temperature conditions of the process. The aim of the invention is to limit this phenomenon without notable loss of activity in the desired principal reaction.

This type of catalyst is compatible with batchwise or continuous, fixed bed use, or with autoclaves and decanters in series.

Operating Conditions for the Transesterification Reaction

The process is operated at temperatures in the range of 130° C. to 220° C., at pressures of less than 10 MPa, with an excess of monoalcohol with respect to the fat/alcohol stoichiometry.

After the reaction, the excess alcohol is evaporated off and the glycerin is separated, preferably by decanting.

Generally, the reaction may be operated using different modes of implementation.

If a continuous reaction is carried out, it is possible to operate with a plurality of autoclaves and decanters. In the first, partial conversion, usually less than 90% and generally approximately 85%, is carried out, then it is decanted by evaporating off the alcohol and cooling; in a second reactor, the transesterification reaction is completed under the cited conditions, adding part of the alcohol which was previously evaporated off. Finally, in an evaporator, the excess alcohol is evaporated off and the glycerin and esters are separated by decanting.

If a continuous fixed bed process is selected, it is advantageous to operate at temperatures of 130° C. to 220° C., preferably 150° C. to 180° C., at pressures of 1 to 7 MPa, the HSV preferably being in the range of 0.1 to 3, preferably 0.3 to 2 in the first step, and the alcohol/oil weight ratio is from 2/1 to 0.1/1.

If a batch reaction is employed, it is possible to operate in one or two steps, i.e. to carry out a first reaction up to a 55% ester yield, to cool by evaporating off the excess alcohol, to decant the glycerin, to remove it from the medium in order to displace the thermodynamic equilibria, and to finish the reaction by heating up again to between 130° C. and 220° C. and adding alcohol to obtain a conversion of at least 85-90%, preferably total conversion.

It is also possible to envisage a yield of 98% of esters by operating for a sufficiently long time in a single step under appropriate conditions, for example by increasing the temperature and/or the alcohol/fat ratio.

Thus, at the end of these two steps, a biodiesel is obtained which satisfies specifications. The degree of conversion is adjusted in order to obtain a fuel ester which satisfies specifications and a high purity glycerin, operating thereby in one or two steps.

The leaching behaviour is verified in the present invention by a quantity of dissolved trace metals deriving from the catalyst which is both in the ester formed and in the glycerin produced, of less than 1 ppm, as well as by the stability of the activity of the catalyst over time.

The stability of the catalyst is evaluated experimentally over time by monitoring its activity (conversion of triglycerides and/or yield of rapeseed methyl ester).

The ester and the glycerol obtained do not contain impurities derived from the catalyst. For this reason, no purification treatment has to be applied in order to eliminate the catalyst or the residues therefrom, in contrast to catalysts functioning in accordance with a homogeneous process wherein the catalyst or its residues are, after reaction, located in the same phase as the ester and/or the glycerin.

Using this type of process, final purification is reduced to a minimum, while allowing a fuel specification ester to be obtained along with a glycerin with a purity in the range of 95% to 99.5%, preferably in the range of 98% to 99.5%. The detected glycerin impurities are diglycerol (reaction of two molecules of glycerol), 1- and 2-methoxyglycerol and water. The quantity of ethers in the glycerin produced is less than 1%, preferably les than 0.5%.

Analyses of Reagents and Products

Assaying of glycerides and esters of the ester phase: Samples were taken regularly during the test in order to monitor the progress of the reaction. The samples were washed with an aqueous saturated NaCl solution then after decanting, the upper organic phase, diluted in THF, was analyzed by GPC analysis (gel permeation chromatography). Steric exclusion chromatography could be used to separate the products according to their size/steric hindrance. The equipment used was an HPLC WATER apparatus provided with 3 Waters styragel columns (THF) with a 0-1000 g/mol molar mass range. These columns were placed in a thermostatted oven at 40° C. The detector was a Waters 2414 refractometer.

Assay of ethers of glycerin on final sample: At the end of the reaction, the reaction effluents were filtered on a 0.1 µm Teflon filter and the methanol was evaporated off using a rotary evaporator. A two-phase system was obtained, composed of an apolar phase containing the glycerides and the esters and a polar phase containing the glycerin and the ethers.

Assay of quantity of ethers in the glycerin: This analysis was carried out on the polar phase recovered at the end of the reaction after evaporating off the methanol and separation of the two phases. The ethers formed were of the methoxyglycerol and diglycerol ether type. The ethers had first to be sylylated using a protocol which is known to the skilled person. The sample preparation was in accordance with the following protocol: 10 to 20 mg of the polar phase was weighed then 200 µL of a calibrating solution of 1,2,4-butanetriol (prepared by adding 50 mg of 1,2,4-butanetriol to 50 ml of pyridine), then one ampoule of a mixture of HMDS (1,1,1-trimethyl-N-(trimethylsilyl)-silanamine)+TCMS (chlorotrimethylsilane)+pyridine, 3:1:9 (Sylon HTP, reference 3-3038), and finally 5 mL of n-heptane and 5 mL of water were added. The apolar upper phase was then analyzed by GC.

The apparatus used was a GC Agilent provided with an on-column injection system, a JW HP5 capillary column (5% phenyl-95% methylpolysiloxane) and a FID detector.

Assay of water in the reagents: The water was assayed by Karl-Fischer assay using a Metrohm 756 coulometer.

Assay of fatty acids: The fatty acids were assayed by volumetric assay using KOH and will be given in mg KOH/g of oil or ester (standard EN 14104).

EXAMPLES

The following examples illustrate the invention without limiting its scope. Example 1 concerns the transesterification of rapeseed oil with methanol in the presence of a controlled quantity of water using a moderately dried zinc aluminate catalyst limited to drying in air. Example 2 concerns the transesterification of rapeseed oil with methanol in the presence of a controlled quantity of water using a zinc aluminate catalyst severely dried by drying with methanol.

The examples given above illustrate the tests which were carried out in a batch reactor and as a result correspond to a single step. In order to obtain a biodiesel satisfying the specifications, it would be necessary at the end of this first step to then carry out decanting by evaporating off the alcohol and cooling, then separating the glycerin from the ester phase, then completing the transesterification reaction by adding the portion of the alcohol which has been evaporated to the ester fraction.

The catalyst used was prepared by mixing a PURAL® SB3 type alumina gel sold by SASOL and zinc oxide (BAYER) in the presence of 6.2% nitric acid in solution in water, in order to obtain a composition of a material the elemental analysis of which was 25% Zn and 37% Al.

The catalyst was extruded with a 3 mm diameter die and underwent a heat treatment at 650° C. for 2 h.

The surface area of the solid was 180 m²/g. X ray diffraction provided a quantitative determination of the various phases. 10% of zinc oxide was detected along with two solid solutions of zinc aluminate: one rich in zinc and a second rich in aluminium.

The oil used in these examples was food quality rapeseed oil with the following fatty acid composition:

TABLE 1

Composition of fatty acids in rapeseed oil

| Fatty acid glyceride | Nature of fatty chain | % by weight |
|---|---|---|
| palmitic | C16:0 | 5 |
| palmitoleic | C16:1 | <0.5 |
| stearic | C18:0 | 2 |
| oleic | C18:1 | 59 |
| linoleic | C18:2 | 21 |
| linolenic | C18:3 | 9 |
| arachidic | C20:0 | <0.5 |
| gadoleic | C20:1 | 1 |
| behenic | C22:0 | <0.5 |
| erucic | C22:1 | <1 |

TABLE 2

Water content and free fatty acid content of oil feed

| Fatty acid content of feed | 0.1 mg KOH/g of oil |
|---|---|
| Water content in feed | 341 ppm by weight |

Example 1

Results of Catalytic Tests in Presence of 1 g of Heterogeneous Acido-basic Zinc Aluminate Catalyst After Drying in Air Alone: Rapeseed Methyl Ester (RME) Yields and Ether Contents of Glycerin Compared in the Presence of Different Water Contents in the Feed Prior to introducing it into the reactor, the catalyst was dried in an oven at 150° C. in air overnight. The LOI of the dried catalyst was 5.75%.

The loss on ignition (LOI) of the powder is measured as the loss in weight corresponding to the ratio: LOI, %=$P_0-P_f/P_0$, in which:

$P_0$=initial weight of starting material;

$P_f$=weight of this starting material after calcining for 2 hours at 550° C. and cooling to ambient temperature in an anhydrous chamber.

25 g of rapeseed oil, 25 g of methanol doped with a controlled quantity of water and assayed using Karl-Fischer assay (315-10422 ppm), was introduced into a closed reactor at ambient temperature, to result in a total concentration in the feed of 328 to 5381 ppm) and 1 g of catalyst prepared as described above. The methanol/oil weight ratio was 1, corresponding to a molar ratio of 27.5. The reactor was then closed, stirred (200 rpm) and heated to 200° C. using a heating magnetic stirrer. The temperature of the reaction medium was stabilized at 200° C. after 30 minutes of heating. The pressure was the autogenous pressure of the alcohol at the operating temperature, i.e. approximately 40 bar. Monitoring of the reaction commenced when the temperature of the reaction medium had reached this set level. Table 3 summarizes the results obtained in terms of ester yield for the samples after 2 h and 4 h of reaction for 5 different water contents in the medium.

TABLE 3

Impact of water content of feed on % RME in the glyceride phase

| Water content in feed (ppm by wt) | RME yield (%) at 2 h | RME yield (%) at 4 h |
|---|---|---|
| 328 | 30.4 | 57.4 |
| 1369 | 29.2 | 55.8 |
| 1698 | 30.1 | 58.2 |
| 2934 | 28.2 | 58.1 |
| 5381 | 27.3 | 57.9 |

Table 4 shows the influence of water content of the medium on the acid index of the ester and on the ether content of the glycerin at the end of the test.

TABLE 4

Impact of water content of feed on acid index of medium and the corresponding quantity of fatty acid produced

| Water content in feed (ppm by wt) | AI (mg KOH/g) of ester | Total % ethers in glycerin |
|---|---|---|
| 328 | 0.37 | 0.60 |
| 1369 | 0.48 | 0.52 |
| 1698 | 0.47 | 0.39 |
| 2934 | 0.49 | 0.34 |
| 5381 | 0.63 | 0.27 |

(The acid index is linked to the fatty acid content by the relationship: AI = 2 × % by wt oleic acid)

These results show that controlled addition of water to the methanol+oil feed for contents of 1698 ppm in the feed can reduce the quantity of ethers in the glycerin by 30%, and for contents of 2934 ppm, this quantity of ethers can be divided by two. For contents of more than 3000 ppm, a still greater increase in the purity of the glycerin is observed, but the increase in the acid index reflects a slight increase in the hydrolysis of esters, which entrains a loss of yield. For water contents in the range 1700 to 3000 ppm, then, a substantial increase in the purity of the glycerin is obtained while keeping the acid index correct, and a yield of ester identical to that obtained with a feed not doped with water. It is observed that the ether content of the glycerol is less than 0.5%.

In the case in which it is desired to obtain an ester which satisfies specifications, it would be necessary to carry out a second step as already mentioned. It would be necessary to evaporate off the methanol then to separate the glycerin. The phase containing the esters and the unconverted glycerides would then be placed in contact with methanol and heated in the presence of the same catalyst in order to bring the reaction to completion.

Under these conditions (removal of glycerin), the final ether content of the glycerol remains below 0.5%.

Example 2

Results of Catalytic Tests in the Presence of 1 g of Heterogeneous Acido-basic Zinc Aluminate Catalyst After Drying in Methanol: Yields of Methyl Esters of Rapeseed (RME) and Ether Contents of Glycerin Compared in the Presence of Different Water Contents in the Feed Prior to introducing it into the reactor, the catalyst was dried in an oven at 150° C. in air overnight. The LOI of the dried catalyst was 5.75%.

The loss on ignition (LOI) of the powder is measured as the loss in weight corresponding to the ratio: LOI, $\% = P_0 - P_i/P_0$, in which:

$P_0$ = initial weight of starting material;
$P_i$ = weight of this starting material after calcining for 2 hours at 550° C. and cooling to ambient temperature in an anhydrous chamber.

1 g of this prepared catalyst was introduced into the reactor. The reactor was then filled with 50 g of MeOH, stirred for 2 h and placed under vacuum at ambient temperature 5 times in succession in order to remove the residual water. The complementary drying was followed by measuring the concentration of MeOH in the water after emptying. Drying was complete when the concentration of water in the methanol at the outlet was within 10% of the concentration of water in the fresh drying MeOH. 5 immersions were normally sufficient.

The LOI of this dried solid was estimated to be less than 2%.

25 g of rapeseed oil, 25 g of methanol doped with a controlled quantity of water and assayed using Karl-Fischer assay to result in a total concentration in the feed of 405 to 5401 ppm and 1 g of catalyst prepared as described above were introduced into a closed reactor at ambient temperature. The methanol/oil weight ratio was 1, corresponding to a molar ratio of 27.5. The reactor was then closed, stirred (200 rpm) and heated to 200° C. using a heating magnetic stirrer. The temperature of the reaction medium was stabilized at 200° C. after 30 minutes of heating. The pressure was the autogenous pressure of the alcohol at the operating temperature, i.e. approximately 40 bar. Monitoring of the reaction commenced when the temperature of the reaction medium had reached this set level. Table 5 summarizes the results obtained in terms of ester yield for the samples after 2 h and 4 h of reaction for 5 different water contents in the medium.

TABLE 5

Impact of water content of feed on % RME in the glyceride phase

| Water content in feed (ppm by wt) | RME yield (%) at 2 h | RME yield (%) at 4 h |
|---|---|---|
| 405 | 31.5 | 62.1 |
| 1203 | 30.3 | 58.2 |
| 1840 | 30.1 | 58.3 |
| 3012 | 28.2 | 57.1 |
| 5401 | 26.3 | 56.7 |

Table 6 shows the influence of water content of the medium on the acid index of the ester and on the ether content of the glycerin at the end of the test.

TABLE 6

Impact of water content of feed on acid index of medium and the corresponding quantity of fatty acid produced

| Water content in feed (ppm by wt) | AI (mg KOH/g) of ester | Total % ethers in glycerin |
|---|---|---|
| 405 | 0.33 | 0.60 |
| 1203 | 0.49 | 0.59 |
| 1840 | 0.51 | 0.57 |
| 3012 | 0.63 | 0.55 |
| 5401 | 1.02 | 0.50 |

(The acid index is linked to the fatty acid content by the relationship: AI = 2 × % by wt oleic acid)

The addition of water to a severely dried catalyst causes a substantially different effect from Example 1. In fact, since the catalyst had been severely dried it was depleted in water which will be adsorbed on the hydrophilic sides of the catalyst (the catalyst is constituted by oxides of a hydrophilic nature), which thus favours the degradation reactions (hydrolysis) of the products present in its vicinity. Thus, these results show that the controlled addition of water to the methanol+oil feed in the presence of a severely dried catalyst can reduce the quantity of ethers in the glycerin to a lesser extent than in the case of the moderately dried catalyst. Similarly, a large increase in the acid index is observed, reflecting a large increase in the hydrolysis of esters, and thus a large loss of yield.

In the case in which moderate drying is carried out, the catalyst is partially saturated with water and there is no co-adsorption of water onto the sites carrying out the target reaction. The available water, in contrast, more rapidly causes an effect on the etherification reactions, a portion of the sites of the moderately dried catalyst being inactive due to the water that is initially present. The water behaves as a selector for the catalyst. In contrast to the partial saturation with water achieved by moderate drying, the extra-dry catalyst produced by drying with methanol contains much less water, if any at all, on the active sites of the catalyst.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 09/04.349, filed Sep. 11, 2009, and French application No. 10/02.971, filed Jul. 15, 2010 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A transesterification process for manufacturing a composition of alcoholic esters of straight chain monocarboxylic acids containing 6 to 26 carbon atoms and glycerin, in which a fat or oil of vegetable or animal origin is reacted with an aliphatic monoalcohol containing 1 to 18 carbon atoms, in the presence of at least one stored zinc aluminate catalyst, characterized in that a controlled quantity of water is added to the reaction medium and said zinc aluminate catalyst is used which, after a heat treatment comprising drying, calcining and storing in air, has undergone a moderate partial drying step prior to use which is limited to drying in air at a temperature of more than 80° C.

2. A process according to claim 1, in which the quantity of water introduced with the feeds is in the range of 1700 to 3000 ppm with respect to the feed.

3. A process according to claim 1, in which the catalyst is characterized by a loss on ignition of the dried catalyst of more than 2%.

4. A process according to claim 1, in which the aliphatic monoalcohol is methanol.

5. A process according to claim 1, wherein the transesterification is operated at a temperature in the range of 130° C. to 220° C., at a pressure of less than 10 MPa, and with an excess of aliphatic monoalcohol with respect to the fat/alcohol stoichiometry.

6. A process according to claim 5, in which after the transesterification reaction, the aliphatic monoalcohol is evaporated off and the glycerin is separated out.

7. A process according to claim 5, in which the transesterification reaction is carried out in a batch manner.

8. A process according to claim 5, in which the transesterification reaction is carried out in a continuous manner, in a fixed bed or with autoclaves and decanters in series.

9. A process according to claim 8, in which the reaction is carried out in a fixed bed, at a temperature in the range of 130° C. to 220° C., at a pressure in the range of 1 to 7 MPa, and at a HSV in the range of 0.1 to 3, with a alcohol/fat weight ratio in the range of 2/1 to 0.1/1.

10. A process according to claim 1, in which the fat or oil is selected from palm oils, soya oil, palm kernel oil, coprah oil, babassu oil, old or fresh rapeseed oil, conventional or oleic sunflower seed oil, corn oil, cotton seed oil, peanut oils, pourghere oil, castor oil, linseed oil and crambe oil, algae and sunflower or rapeseed oils obtained by genetic modification or by hybridization, oils partially modified by polymerization or oligomerization, frying oils, rendered oils, fish oil, seal oil, poultry fat, tallow, suet, or fats from the treatment of waste water.

11. A process according to claim 1, in which the oil has an acid index of less than 0.5 mg KOH/g of oil.

12. A process according to claim 1, in which the heterogeneous catalyst is prepared using a process comprising at least the following steps:
   a) mixing at least one zinc oxide with hydrated alumina in the presence of at least one peptizing agent of the mineral or organic acid type;
   b) extruding the resultant product obtained after mixing;
   c) heat treating comprising drying and calcining the resultant extruded product;
   d) optionally, milling to produce a shape that differs from extrusion;
   e) storing the resultant heat treated extruded product under air forming the catalyst and prior to entering into the reaction, drying the stored catalyst in air at a temperature of more than 80° C.

13. A process according to claim 12, in which the peptizing agent is selected from hydrochloric acid, sulphuric acid, nitric acid, acetic acid and formic acid.

14. A process according to claim 1, in which the glycerin has a purity in the range of 95% to 99.5%.

15. A process according to claim 14, in which the quantity of ethers in the glycerin produced is less than 1%.

16. A process according to claim 1, wherein said drying of the stored catalyst before use is conducted at more than 100° C.

17. A process according to claim 1, wherein said drying of the stored catalyst before use is conducted at 100° C. to 175° C. for 12 to 24 hours.

18. A process according to claim 12, in which the quantity of water introduced with the feeds is in the range of 1700 to 3000 ppm with respect to the feed.

19. A process according to claim 18, in which the glycerin has a purity in the range of 98% to 99.5%.

20. A process according to claim 19, in which the quantity of ethers in the glycerin produced is less than 0.5%.

21. In a transesterification process for manufacturing a composition of alcoholic esters of straight chain monocarboxylic acids containing 6 to 26 carbon atoms and glycerin, in which a fat or oil of vegetable or animal origin is reacted with an aliphatic monoalcohol containing 1 to 18 carbon atoms, in the presence of at least one zinc aluminate catalyst, the improvement wherein the catalyst is partially dried so in air that there is no co-adsorption of water onto sites conducting the transesterification reaction, and sufficient water to inactivate Bronsted acid sites responsible for glycerin degradation reactions, and wherein 1700 to 3000 ppm of water is introduced into the feed for the transesterification reaction.

* * * * *